United States Patent
Adachi et al.

(10) Patent No.: US 9,358,936 B2
(45) Date of Patent: Jun. 7, 2016

(54) ELECTRICAL CONDUCTION PATH STRUCTURE AND WIRING HARNESS INCORPORATING THE SAME

(75) Inventors: Hideomi Adachi, Shizuoka (JP); Hidehiko Kuboshima, Shizuoka (JP); Akio Kitami, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 13/980,275

(22) PCT Filed: Jan. 18, 2012

(86) PCT No.: PCT/JP2012/000270
§ 371 (c)(1),
(2), (4) Date: Jul. 17, 2013

(87) PCT Pub. No.: WO2012/098870
PCT Pub. Date: Jul. 26, 2012

(65) Prior Publication Data
US 2013/0299235 A1    Nov. 14, 2013

(30) Foreign Application Priority Data
Jan. 20, 2011    (JP) .................................. 2011-009445

(51) Int. Cl.
*B60R 16/02* (2006.01)
*B60L 3/00* (2006.01)

(52) U.S. Cl.
CPC .......... *B60R 16/0207* (2013.01); *B60L 3/0069* (2013.01)

(58) Field of Classification Search
USPC ....................................................... 172/72 A
See application file for complete search history.

(56) References Cited

U.S. PATENT DOCUMENTS

| 3,459,880 | A | * | 8/1969 | Erdle | ................... | H01B 7/0018 |
|---|---|---|---|---|---|---|
| | | | | | | 174/117 FF |
| 4,808,773 | A | * | 2/1989 | Crandall | ................ | H01B 11/12 |
| | | | | | | 174/113 R |
| 6,333,845 | B1 | * | 12/2001 | Hashizawa | ............... | H01H 9/10 |
| | | | | | | 337/194 |

(Continued)

FOREIGN PATENT DOCUMENTS

| DE | 20 2010 006 326 U1 | 8/2010 |
|---|---|---|
| EP | 0 282 389 A1 | 9/1988 |

(Continued)

OTHER PUBLICATIONS

European Office Action for the related European Patent Application No. 12 708 169.3 dated Aug. 6, 2014.

(Continued)

*Primary Examiner* — Timothy Thompson
*Assistant Examiner* — Krystal Robinson
(74) *Attorney, Agent, or Firm* — Kenealy Vaidya LLP

(57) ABSTRACT

A wiring harness can include a plurality of high-voltage electrical conduction paths, a motor connector provided at one ends of the high-voltage electrical conduction paths, and an inverter connector provided at the other ends of the high-voltage electrical conduction paths. An extra-length portion can be provided at an intermediate portion of the conductor. The extra-length portion can be configured to absorb displacement caused by a force acting upon the wiring harness and forcing it to be extended. The extra-length portion can take a folded shape obtained by folding the conductor.

7 Claims, 2 Drawing Sheets

(56) References Cited

U.S. PATENT DOCUMENTS

| | | | |
|---|---|---|---|
| 7,172,042 B2 | 2/2007 | Yamaguchi et al. | |
| 2003/0102148 A1 | 6/2003 | Ohara et al. | |
| 2003/0184118 A1* | 10/2003 | Sano | B60J 5/06 296/155 |
| 2004/0248434 A1 | 12/2004 | Fujimura | |

FOREIGN PATENT DOCUMENTS

| | | | |
|---|---|---|---|
| EP | 0 535 712 A2 | | 4/1993 |
| EP | 1 073 159 A2 | | 1/2001 |
| GB | 1 181 449 A | | 2/1970 |
| JP | 01307709 A | * | 12/1989 |
| JP | 2004-224156 A | | 8/2004 |
| JP | 2005-294039 A | | 10/2005 |
| JP | 2005294039 A | * | 10/2005 |
| JP | 2010157450 A | * | 7/2010 |

OTHER PUBLICATIONS

International Search Report and Written Opinion of the International Search Report for PCT/JP2012/000270 dated May 2, 2012.

* cited by examiner

ELECTRICAL CONDUCTION PATH STRUCTURE AND WIRING HARNESS INCORPORATING THE SAME

This application is a U.S. national phase filing under 35 U.S.C. §371 of PCT Application No. PCT/JP2012/000270, filed Jan. 18, 2012, and which in turn claims priority under 35 U.S.C. §119 to Japanese Patent Application No. JP2011-009445, filed Jan. 20, 2011, the entireties of which are incorporated by reference herein.

TECHNICAL FIELD

The present invention relates to a structure of an electrical conduction path with an extra-length portion. The invention also relates to a wiring harness including this electrical conduction path structure.

BACKGROUND ART

In recent years, eco-friendly cars such as hybrid automobiles and electric automobiles have been attracting attention and getting more prevalent. The hybrid automobiles and electric automobiles incorporate a motor as a power source. In order to drive the motor, a battery has to be electrically connected to an inverter and the motor via wiring harnesses for high-voltage use. The high-voltage wiring harnesses comprise a plurality of high-voltage electrical wires serving as electrical conduction paths.

A variety of types of high-voltage wiring harnesses have been advocated, one example of which can be found in the disclosure of the following patent literature PTL1.

CITATIONS LIST

Patent Literature

PTL 1: Japanese Patent Application Laid-Open Publication No. 2004-224156

SUMMARY OF THE INVENTION

Technical Problem

In a case where an external impacts acts from without upon the hybrid automobiles and the electric automobiles, i.e., when a collision occurs, the high-voltage electrical wires constructing the wiring harness might be cut. Also, flow of large current is very dangerous when the high-voltage electrical wire is disconnected and the conductor exposed to the outside is in contact with a conductive element, devices or a body frame.

An approach to addressing the above problem is to provide an extra length in the high-voltage electrical wires so that the high-voltage electrical wires are not disconnected. Specifically, the presence of the extra length in the high-voltage electrical wire allows absorption of displacement to the extent of the length of this extra length. However, the presence of the extra length also implies that the length of the high-voltage electrical wire is increased, which could negatively affect the space necessary for arranging the wiring harnesses. Also, another drawback is that it will be necessary to provide a dedicated component for the extra length.

In view of the above-described situation, an object of the present invention is to provide an electrical conduction path structure and a wiring harness that provide an extra length with constraints regarding the space necessary for arranging the wiring harness taken into due consideration.

Solution to Problem

With a view to providing solution to the above-identified problem, a first aspect of the present invention provides an electrical conduction path structure comprising an extra-length portion provided at an intermediate portion of a conductor constructing an electrical conduction path, the extra-length portion having a folded shape such that the extra-length portion taken out of a folded state and placed in an extended state constitutes an extra length of the conductor.

The present invention having these features provides the electrical conduction path structure with extra-length portion provided at the intermediate portion of the conductor in the folded shape. The extra-length portion will be an extra length in its literal sense when it is taken out of the folded state.

A second aspect of the present invention provides, in the context of the electrical conduction path structure of the first aspect, the electrical conduction path structure further comprising a sheath member covering the conductor, the sheath member being provided on the extra-length portion that has already been placed in the folded state.

The present invention having these features provides the electrical conduction path structure that is electrically insulated from the outside by the sheath member covering the conductor. The extra-length portion takes the folded shape to be placed in the folded state and then covered by the sheath member.

A third aspect of the present invention provides, in the context of the electrical conduction path structure of the second aspect, the electrical conduction path structure characterised by the fact that the sheath member includes a groove provided in a portion of the sheath member corresponding to the extra-length portion.

The present invention having these features provides the electrical conduction path structure where the sheath member provided at the position corresponding to the extra-length portion includes the groove. The sheath member is configured to cause splitting at the position corresponding to the extra-length portion.

A fourth aspect of the present invention provides the electrical conduction path structure of any one of the first to third aspects further characterized by the fact that the conductor has flexibility and a busbar-like shape or a bar-like shape.

The present invention having these features provides the electrical conduction path structure that includes the flexible conductor formed in the busbar-like shape or the bar-like shape.

Also, a fifth aspect of the present invention provides a wiring harness that includes the electrical conduction paths having the electrical conduction path structure according to any one of the first to fourth aspects.

The present invention having these features provides a wiring harness that absorbs the displacement of the wiring harness within the range of the length of the extra length in the electrical conduction path.

Advantageous Effects of Invention

The present invention according to the first aspect thereof has the following advantageous effects. Since the extra-length portion is formed in the folded shape, the length thereof can be reduced in the folded state. Accordingly, since it does not become excessively long, it is made possible to minimize the space necessary for arranging the wiring harness. Also, since the extra-length portion is formed in the folded shape, the extra-length portion taken out of the folded state can be extended when an external impact acts from without thereupon. Thus, the displacement can be absorbed within the range of the length of the extension. Further, by virtue of the extra-length portion in the folded shape, it is made possible to provide the extra length in the wiring harness with the space necessary for arranging the wiring harness taken into consideration.

The invention according to the second aspect thereof has the following advantageous effects. The conductor can be first placed in the folded shape and then the sheath member can be formed thereupon, in place of first providing the sheath member and then making the extra-length portion in the folded shape. Accordingly, it is appreciated that the conductor does not become large even when the extra-length portion is placed in the folded shape, which facilitates making of the sheath member.

The invention according to the third aspect thereof has the following advantageous effects. When an external impact acts from without thereupon, splitting is allowed to occur by virtue of the groove of the sheath member. Accordingly, the presence of the groove allows the sheath member to follow the extension of the conductor.

The invention according to the fourth aspect thereof has the following advantageous effects. By virtue of the flexibility of the conductor, folding operation of the conductor can be facilitated. Also, the effect can be obtained by the busbar-like shape or the bar-like shape that the folding operation can be facilitated. Accordingly, the present invention facilitates making of the extra-length portion.

The invention according to the fifth aspect thereof has the following advantageous effects. Application of the electrical conduction path structure having the above-described effects will facilitate manufacturing of improved wiring harnesses.

BRIEF DESCRIPTION OF THE DRAWINGS

In the drawings there are depicted an exemplary electrical conduction path structure and an exemplary wiring harness of the present invention, and another exemplary high-voltage electrical conduction path, in which.

DESCRIPTION OF EXEMPLARY EMBODIMENTS

An electrical conduction path structure is a structure that includes an extra-length portion having a folded shape and provided at an intermediate region of a conductor, whose extra-length portion will be an extra length in its literal sense when it is take out of the folded state. The wiring harness comprises a plurality of electrical conduction path with extra-length portion each having a folded shape.

First Embodiment

Figure 1A:
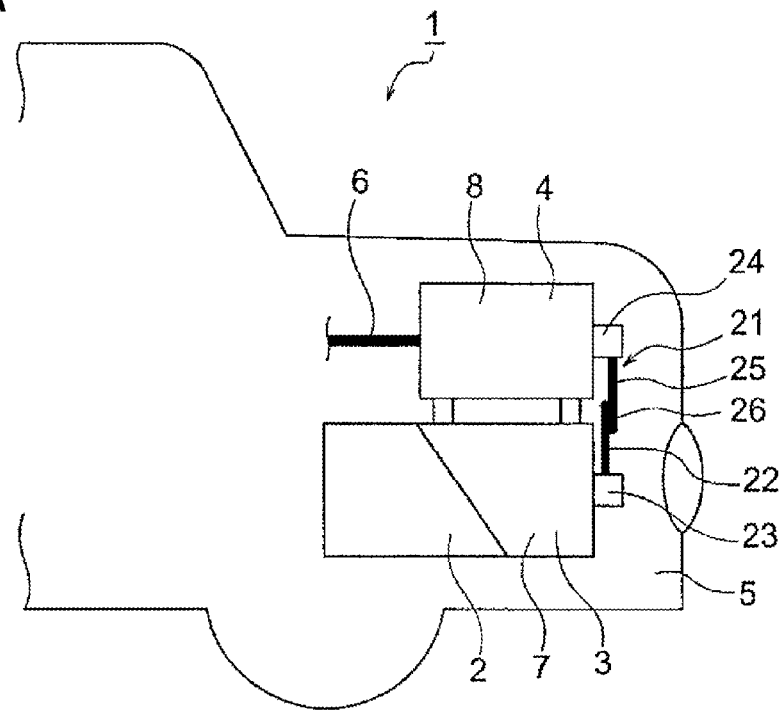
FIG. 1A schematically illustrates a hybrid automobile having the exemplary electrical conduction path structure and wiring harness of the present invention.
Figure 1B:
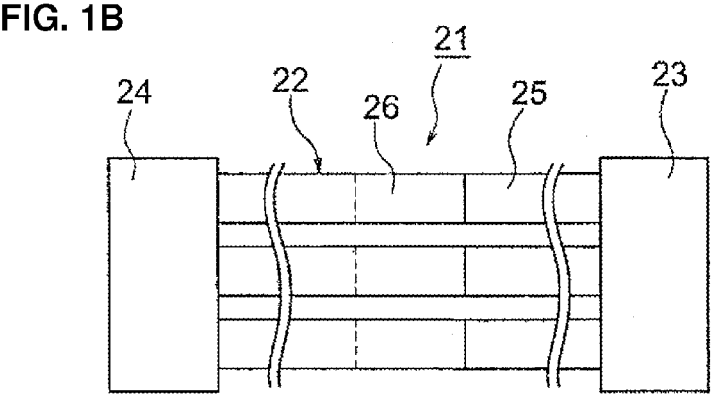
FIG. 1B schematically illustrates the exemplary wiring harness of the present invention.
Figure 1C:
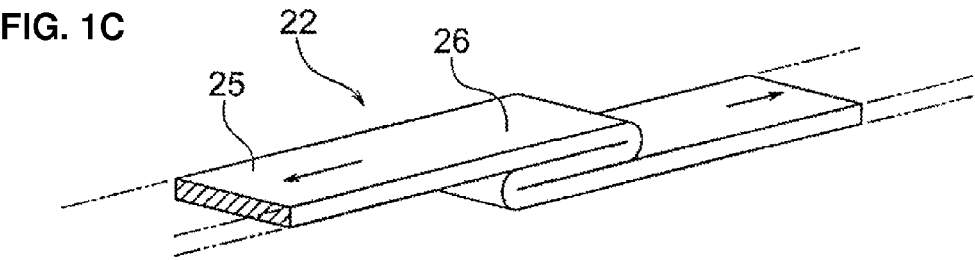
FIG. 1C is a perspective view of an extra-length portion in a high-voltage electrical conduction path in the exemplary electrical conduction path structure and the exemplary wiring harness of the present invention.

A first embodiment of the invention is hereafter described with reference to the drawings, where FIG. 1A illustrates an exemplary electrical conduction path structure and an exemplary wiring harness of the present invention, in which a hybrid automobile is schematically illustrated; FIG. 1B illustrates the exemplary wiring harness of the present invention, in which is schematically illustrated; and FIG. 1C illustrates a perspective view of an extra-length portion in a high-voltage electrical conduction path.

The following illustrative embodiment is described in the context of a hybrid automobile. It should be appreciated from the description of the following embodiments that the configuration, arrangement, and effects of the electrical conduction path structure of the invention will remain basically the same when it is applied to an electric automobile. In addition, it is also contemplated that the invention can be applied to conventional automobiles other than hybrid automobiles and electric automobiles.

Referring first to FIG. 1, there is depicted a hybrid automobile labeled by the reference sign 1. The hybrid automobile 1 is driven in a hybrid manner by two power sources, i.e., an engine 2 and a motor unit 3. Electrical power is fed to the motor unit 3 by a not-shown battery (battery pack) and via an inverter unit 4.

It is contemplated in this embodiment that the engine 2, the motor unit 3, and the inverter unit 4 are arranged in an engine room 5 provided at a location near the automobile's front wheels. The battery, on the other hand, is arranged in a rear portion of the automobile where rear wheels thereof are provided (alternatively, the battery may be arranged in an interior of the automobile next to the engine room 5).

The motor unit 3 and the inverter unit 4 are connected to each other via a wiring harness 21, which is adapted for high-voltage use. Likewise, a not-shown battery and the inverter unit 4 are connected to each other via a wiring harness 6 adapted for high-voltage use. The wiring harness 6 may be arranged in the engine room 5 and extended therefrom along an underside of a floor panel, the underside facing the ground.

As supplementary information of this embodiment, the motor unit 3 may comprise a motor and a generator. It is also contemplated that the inverter unit 4 may comprise an inverter and a converter. The motor unit 3 may be configured as a motor assembly including a shielding case 7. Further, it is also contemplated that the inverter unit 4 may be configured as an inverter assembly including a shielding case 8.

The not-shown battery may comprise a modular (or modularized) nickel metal hydride (Ni—MH) battery or a lithium-ion battery. In addition, the battery may include a storage device for storing electric charge such as a capacitor. The battery, however, does not need to have a specific configuration as long as the battery can be put in service aboard the hybrid automobile 1 or the electric automobile.

The inverter unit 4 in this embodiment is arranged immediately above the motor unit 3 to be secured thereto. In other words, the inverter unit 4 and the motor unit 3 are arranged proximate to each other. Given the specific arrangement, the wiring harness 21 is relatively small in length. There is provided a plurality of securing legs labeled by the reference sign 9 for securing the inverter unit 4 immediately above the motor unit 3.

The wiring harness 21 is described in more detail hereinbelow.

As has been mentioned in the foregoing, the wiring harness 21 comprises a plurality of high-voltage electrical conduction paths 22 (electrical conduction paths adapted for use in high voltage conditions), the high-voltage electrical conduction paths 22 being adapted to electrically connect the motor unit 3 and the inverter unit 4 to each other; a motor connector 23 provided at one ends of the high-voltage electrical conduction paths 22; and an inverter connector 24 provided at the other ends of the high-voltage electrical conduction paths 22.

In this embodiment, there are provided three high-voltage electrical conduction paths 22 (it should be noted that the number of the paths 22 is only by way of example). The three high-voltage electrical conduction paths 22 are arranged spaced by a predetermined degree from each other and substantially on the same plane.

The motor connector 23 is operable to be inserted into the shielding case 7 of the motor unit 3 to establish electrical connection between the paths 22 and the motor unit 3. Also, the inverter connector 24 is likewise operable to be inserted in the shielding case 8 of the inverter unit 4 to establish electrical connection between the paths 22 and the inverter unit 4.

The motor connector 23 and the inverter connector 24 each include, although not illustrated in the figures, a terminal and an electrically insulating housing. In this embodiment, the terminal is made in one piece with an end of a conductor 25 (which will be described later) of the high-voltage electrical conduction path 22.

The high-voltage electrical conduction paths 22 each comprise a conductor 25 having electrical conductivity. The conductor 25 is flexible and has a predetermined width and thickness to take a busbar-like shape (or a strip-like shape). The conductor 25 may be formed by press working of a conductive metal plate (which may be made of copper, copper alloy, or aluminum alloy). In this manner, the conductor 25 has flexibility so that shaping and forming of an extra-length portion 26 (which will be described later) is facilitated. Also, the conductor 25 has a readily-extendible shape.

It is also contemplated that the conductor 25 may take a shape other than such a busbar-like shape. For example, a bar-like conductor structure may have a rectangular or circular cross section (e.g., rectangular or round single-core conductor structure), or may have a conductor structure constructed by twisting strands. The configuration of the conductor 25 is not limited to a specific configuration as long as the extra-length portion 26 can be provided. It is appreciated here that the conductor 25 made of aluminum will be more light-weighted.

The extra-length portion 26 is provided at an intermediate portion of the conductor 25. The extra-length portion 26 is configured to absorb displacement of the wiring harness 21 caused by a force forcing the wiring harness 21 to extend (for example, in a case where an external impact force such as collision acts thereupon, causing such displacement).

It should be noted that the extra-length portion 26 does not take a shape of a mere excessive portion but a folded shape, i.e., a shape where folding of the conductor 25 is provided in the extra-length portion 26.

The folded shape denotes a shape formed by folding the conductor 25 such that portions of the surface of the conductor 25 are brought into close contact with each other or spaced from each other.

The extra-length portion 26 can be taken out of the folded state and extended to the extent corresponding to the number of times of the folding operation. It is by virtue of this extension that the extra length is created.

At least one extra-length portion 26 is provided in a portion of the conductor 26 in the longitudinal direction of the conductor 25. The number of the extra-length portion 26 and the number of times of the folding operation may be defined in view of the need of obtaining a desired extra length.

Also, the arrangement of the extra-length portion 26 may be defined in accordance with the position upon which the external force acts and the position where the extra-length portion 26 can be readily extended.

It is appreciated that the extra-length portion 26, as it has the folded shape and the conductor 25 has the busbar-like shape (or the bar-like shape), does not need to include a dedicated retaining member.

In the above-described configuration and structure, the extra-length portion 26 has the folded shape, so that it can be made small in length in the folded state. Accordingly, since it does not become excessively long, it is made possible to minimize the space necessary for arranging the wiring harness in this state.

Also, since the extra-length portion 26 takes the folded shape, it can be taken out of the folded state to be extended when an external impact acts from without thereupon. Accordingly, the displacement of the wiring harness 21 can be absorbed within the range of the length of the extension of the extra-length portion 26.

Since the wiring harness 21 has the extra-length portion 26 placed in the folded shape, it is made possible for the wiring harness 21 to have its extra length defined with the space necessary for arranging the wiring harness taken into consideration.

Second Embodiment

Figure 2A:
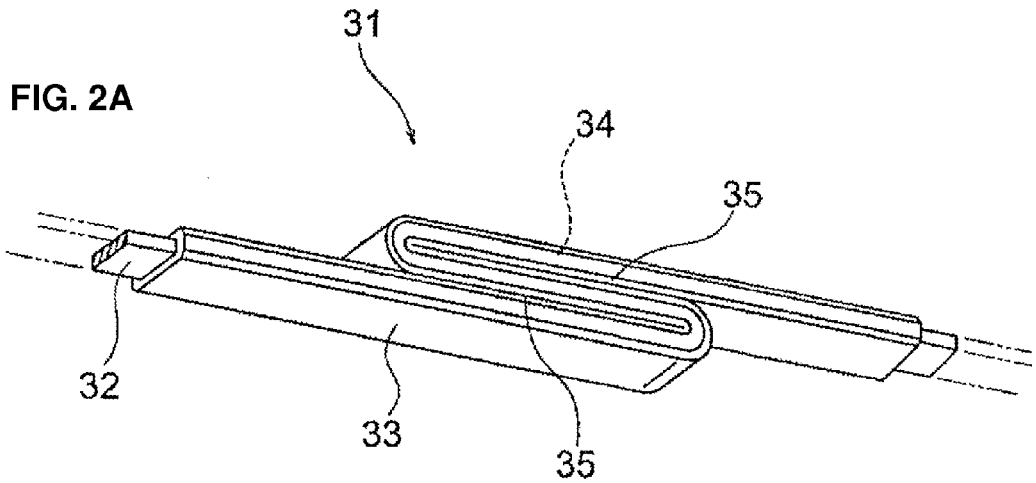
FIG. 2A is a perspective view of an extra-length portion in another exemplary high-voltage electrical conduction path of the present invention.
Figure 2B:
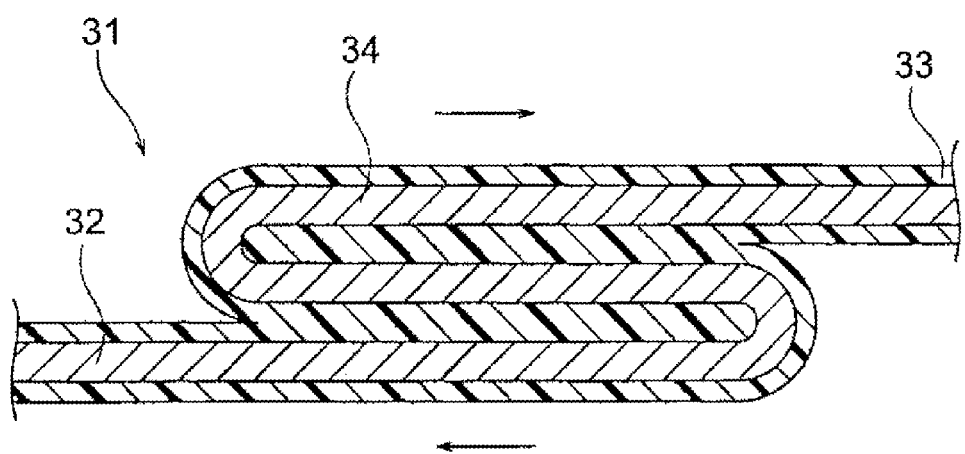
FIG. 2B is a cross-sectional view of the extra-length portion in the other high-voltage electrical conduction path.
Figure 2C:
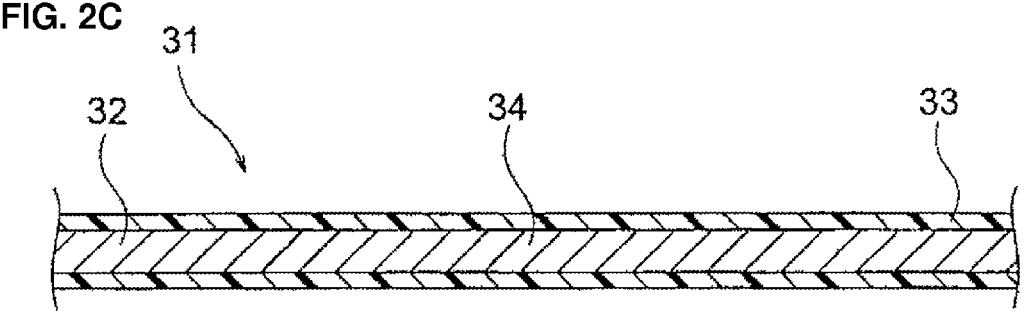
FIG. 2C is a cross-sectional view of the extra-length portion in an extended state in the other high-voltage electrical conduction path.

A second embodiment is described below with reference to the drawings, in which FIG. 2A is a perspective view of an extra-length portion in another exemplary high-voltage electrical conduction path; FIG. 2B illustrates a cross-sectional view of the extra-length portion of the another exemplary high-voltage electrical conduction path; and FIG. 2C illustrates a cross-sectional view of the extra-length portion in an extended state in the other exemplary high-voltage electrical conduction path.

Referring now to FIG. 2, a high-voltage electrical conduction path 31 (electrical conduction paths adapted for use in high voltage conditions) comprises a conductive conductor 32 and a sheath member 33 covering the conductor 32.

The conductor 32 of this embodiment has the same configuration as that of the above-described conductor 25 (see FIG. 1) and has flexibility. Also, the conductor 32 is also formed in a busbar-like shape (shape of a strip) having predetermined width and thickness.

There is provided an extra-length portion 34 at an intermediate portion of the conductor 32 in a similar manner to the above-described extra-length portion 26 (see FIG. 1). The extra-length portion 34 is configured to absorb displacement of the wiring harness caused by a force forcing the wiring harness to extend (for example, in a case where an external impact force such as collision acts thereupon, causing such displacement).

It should be noted that the extra-length portion 34 does not take a shape of a mere excessive portion but a folded shape, i.e., a shape where folding of the conductor 32 is provided in the extra-length portion 34. The folded shape denotes a shape formed by folding the conductor 32 such that portions of the surface of the conductor 32 are brought into close contact with each other or spaced from each other.

The extra-length portion 34 can be taken out of the folded state and extended to the extent corresponding to the number of times of the folding operation. It is by virtue of this extension that the extra length is created.

At least one extra-length portion 34 is provided in a portion of the conductor 26 in the longitudinal direction of the conductor 32.

The number of the extra-length portion 34 and the number of times of the folding operation may be defined in view of the need of obtaining a desired extra length. Also, the arrangement of the extra-length portion 34 may be defined in accordance with the position upon which the external force acts and the position where the extra-length portion 34 can be readily extended.

It is appreciated that the extra-length portion 34, as it has the folded shape and the conductor 32 has the busbar-like shape (or the bar-like shape), does not need to include a dedicated retaining member.

The sheath member 33 is made of electrically insulating material and may have waterproofness so as to protect the conductor 32. The sheath member 33 may be formed by overmolding of the conductor 32 with an elastomer such as rubber and thermoplastic elastomer. The sheath member 33 of this embodiment may be made by forming an extra-length portion 34 at an intermediate portion of the conductor 32 and providing overmolding thereon.

By virtue of providing and overmolding the extra-length portion 34, the opposed portions of the conductor 34 are each placed in contact with the elastomer at the location where the extra-length portion 34 is provided (see FIG. 2B). Accordingly, in assembling operation of the wiring harness, the shape of the extra-length portion 34 of the wiring harness is kept in a retained state to facilitate the assembling operation.

At a location where the extra-length portion 34 is provided, there is provided a groove 35 on the outer surface of the sheath member 33. The groove 35 is configured such that, for example when the external force acts thereupon, it can cause splitting via the groove 35. The groove 35 is configured such that it can make the sheath member 33 follow the extension of the conductor 32. The groove 35 of this embodiment is configured such that a chamfered portion on the outer surface is formed in a shape of a groove.

In the above-described configuration and structure, since the wiring harness including the above-described high-voltage electrical conduction path 31 has the extra-length portion 34, has the same or like effects as in the first embodiment.

In addition, in the second embodiment, the extra-length portion 34 is formed, and then the sheath member 33 is formed by overmolding, but the present invention is not limited to this specific configuration. Specifically, it is also contemplated that the sheath member is first formed around the conductor and then the folding is provided so that the extra-length portion in the folded shape is provided.

It will be appreciated that the present invention can be reduced to practice with various modifications made thereto within the range that the scope and spirit of the present invention is not deviated from.

REFERENCE SIGNS

1 Hybrid automobile
2 Engine
3 Motor unit
4 Inverter unit
5 Engine room
6 Wiring harness
7, 8 Shielding case
9 Securing leg
21 Wiring harness
22 High-voltage electrical conduction path (electrical conduction path)
23 Motor connector
24 Inverter connector
25 Conductor
26 Extra-length portion
31 High-voltage electrical conduction path (electrical conduction path)
32 Conductor
33 Sheath member
34 Extra-length portion
35 Groove

The invention claimed is:

1. An electrical conduction path structure comprising
an extra-length portion provided at an intermediate portion of a conductor constructing an electrical conduction path,
wherein the extra-length portion includes the extra-length section having the length which is able to absorb the extended displacement caused by a force acting on the electrical conduction path when an external physical impact is applied thereto,
wherein the conductor of the extra-length section is integrally formed into an extensible folded shape by overlapping the conductor such that the outer surface of the electrical conduction path is in close contact with each other,
wherein the extra-length portion is formed to be the extra-length section when extending from a folded state,
wherein the extra-length portion is integrally formed with a sheath member covering the conductor,
wherein the sheath member is provided on the extra-length portion that has already been placed in the folded state, and
wherein the sheath member is formed by overmolding so that opposed portions of the conductor are each placed in contact with the sheath member at the location where the extra-length portion is provided.

2. The electrical conduction path structure according to claim 1, wherein the sheath member includes a groove provided in a portion of the sheath member corresponding to the extra-length portion.

3. The electrical conduction path structure as recited in claim 2, further comprising a plurality of the conductors or the electrical conduction paths.

4. The electrical conduction path structure according to claim 2, wherein the conductor is flexible and has a busbar-like shape or a bar-like shape.

5. The electrical conduction path structure according to claim 1, wherein the conductor is flexible and has a busbar-like shape or a bar-like shape.

6. The electrical conduction path structure as recited in claim 5, further comprising a plurality of the conductors or the electrical conduction paths.

7. The electrical conduction path structure as recited in claim 1, further comprising a plurality of the conductors or the electrical conduction paths.

* * * * *